July 28, 1959 J. W. THOMSON, JR 2,896,647
RINSER FOR ONE-WAY BOTTLES
Filed May 24, 1955 3 Sheets-Sheet 1
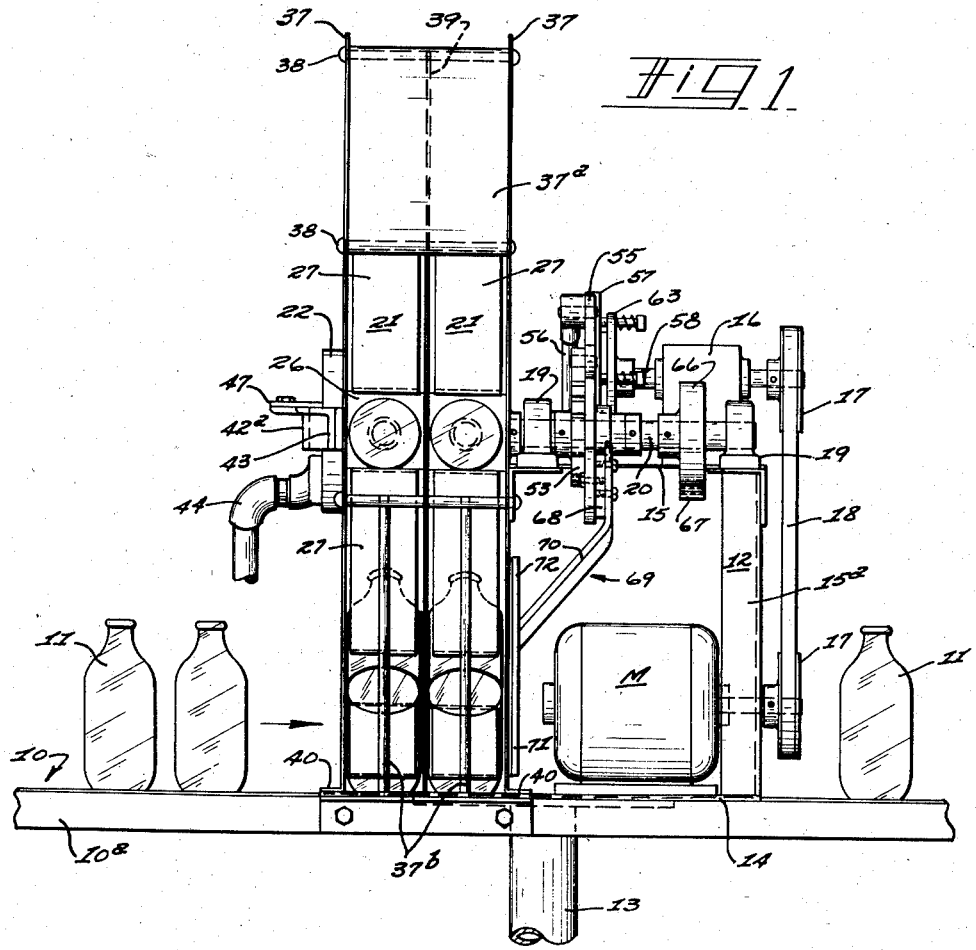
Fig. 1
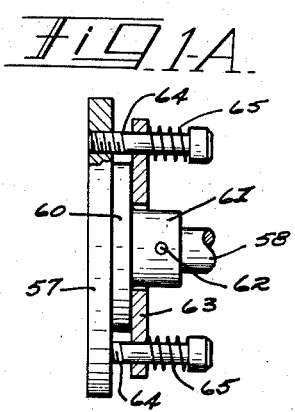
Fig. 1-A
INVENTOR
JOHN W. THOMSON JR.
BY
Rule & Hoge
ATTORNEYS July 28, 1959 J. W. THOMSON, JR 2,896,647
RINSER FOR ONE-WAY BOTTLES
Filed May 24, 1955 3 Sheets-Sheet 2
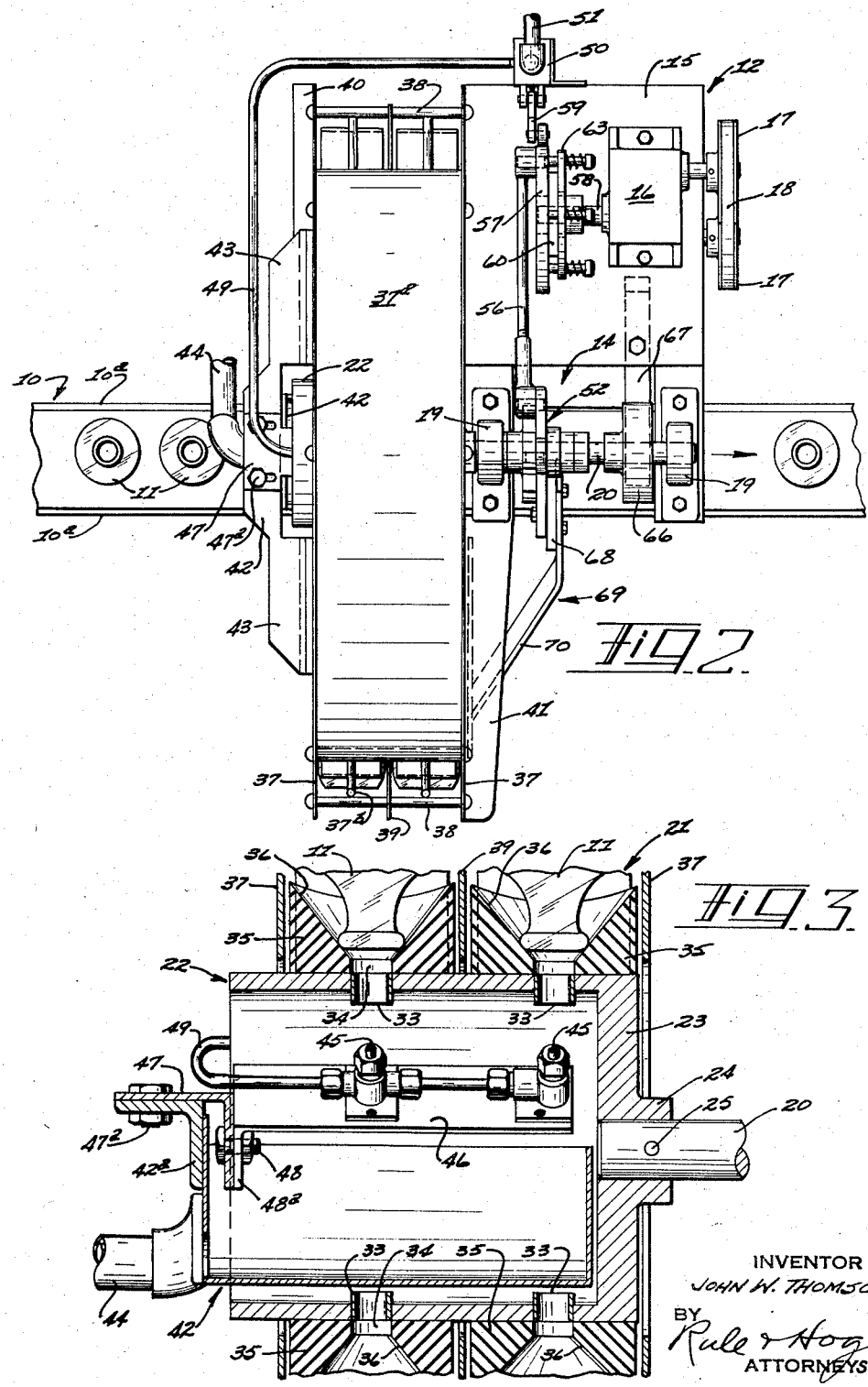

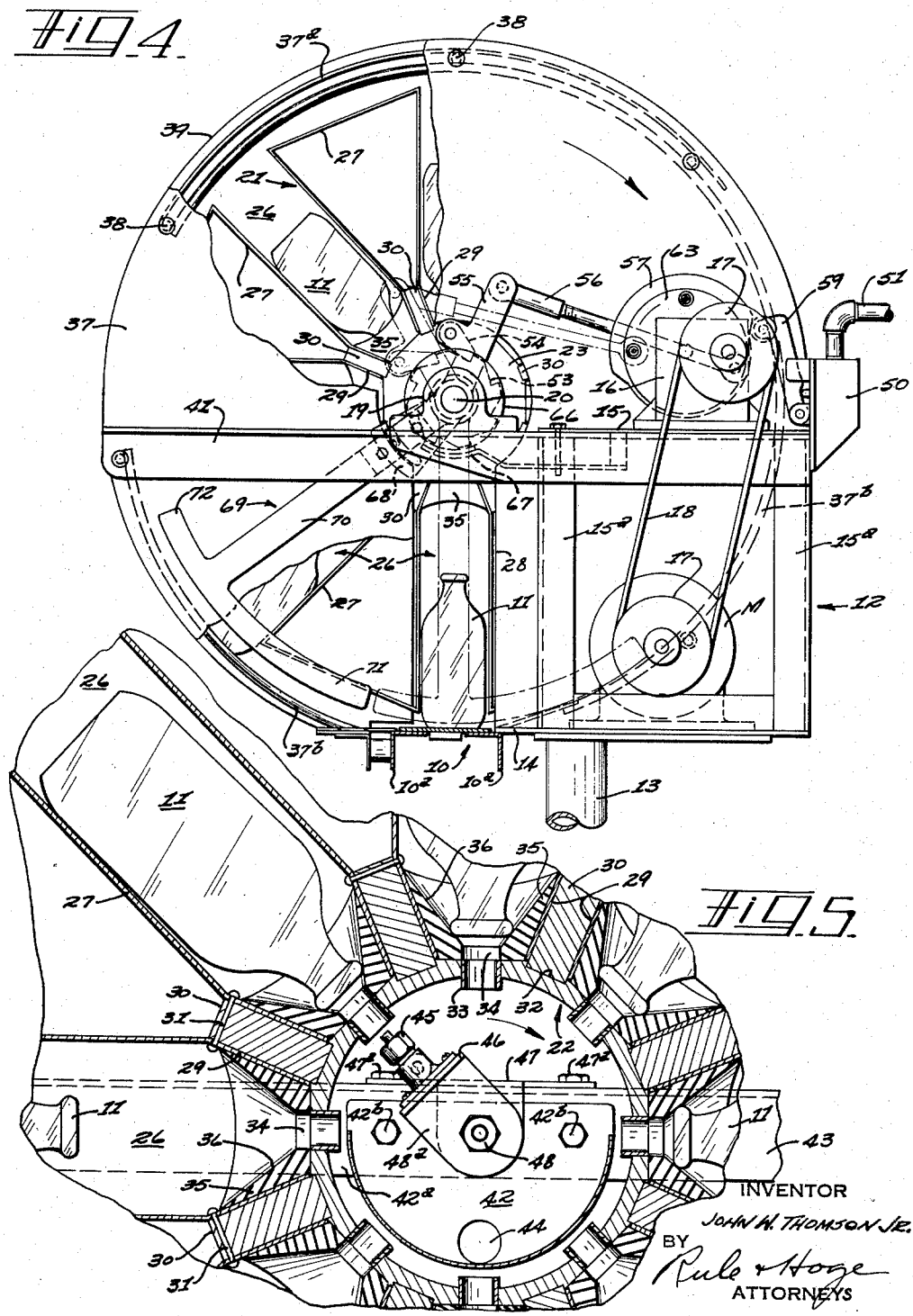

United States Patent Office 2,896,647
Patented July 28, 1959

2,896,647

RINSER FOR ONE-WAY BOTTLES

John W. Thomson, Jr., Menlo Park, Calif., assignor to Owens-Illinois Glass Company, a corporation of Ohio Application May 24, 1955, Serial No. 510,653

4 Claims. (Cl. 134—133)

The present invention is a rinser for glass bottles, jars, and the like containers, designed for operation automatically to effect removal of dust and the like foreign particles from the interior of such articles just prior to delivery of the articles to a filling and closing machine and to such end utilizing water, air under pressure or any other suitable cleansing agent.

It is not uncommon for dust and such particles of foreign matter to enter and collect in bottles, jars and the like containers between the time of their production in the glass plant and their delivery to a filling and capping machine in the plant of the packer. Obviously, it is imperative that such foreign matter be removed prior to filling and capping and that such be done in an efficient manner and at sufficiently high speed that the full productive capacity of the filling and capping machine may be utilized.

An object of my invention is the provision of a rinsing apparatus which may be placed upon an endless horizontal conveyor, the latter moving continuously and operating to deliver bottles or such articles in succession and in upright positions to the rinser. The rinser operates automatically to remove the bottles one or two at a time from the conveyor and carry them in a circular path to a fluid injection station and thence through a drain zone and finally back to a position where they are again placed upright upon the continuously moving conveyor.

An important object of my invention is the placement of the rinsing apparatus over the conveyor in such fashion that it is readily adaptable for use with the simplest form of conveyor and provides for delivery of the articles to and removal from the rinser without necessitating any change in the general direction of travel of the articles.

Another object of my invention is the provision of a pocketed rotor mounted with its axis extending horizontally and in alignment with the direction of travel of the conveyor, ogether with novel means for effecting step-by-step rotation of said rotor and positive stopping of the rotor at each indexed position.

It is also an object of my invention to provide a novel rotor and pocket construction which is of such character as to materially facilitate initial assemblage and if necessary, later replacement of parts.

A further object of my invention is the provision of a novel pocket structure which incorporates at its inner end a cushion, which, in addition to functioning as a shock absorber to prevent breakage of the glass containers, which are moved into contact therewith by gravity, also serves as a centering device and means providing sealing contact with the rim end of the bottle or jar neck.

A still further object of my invention is the provision of a novel arrangement of cleaning fluid injection nozzle and catch-pan arrangement whereby to insure in the first instance accurate delivery of the cleaning fluid and later collection at a central point of the fluid which drains by gravity from the containers.

It is likewise an object of my invention to provide a simple and effective device operating in synchronism with the rinser to periodically bring the bottles or jars to a standstill within a pocket of the rinser and at other times permit release of one or more such articles from a pocket for delivery by the conveyor to a filling and capping machine.

Other objects will be in part apparent and in part pointed out hereinafter.

In the drawings:

Fig. 1 is an elevational view of the rinser mounted upon a horizontal conveyor.

Fig. 1–A is a fragmentary detail sectional view of the slip-clutch unit.

Fig. 2 is a top plan view thereof.

Fig. 3 is a fragmentary vertical sectional view of the rotor hub and cushion in ends of the pockets.

Fig. 4 is an elevational view taken from the righthand side of Fig. 1.

Fig. 5 is a fragmentary detailed sectional view of the hub and several of the pockets of the rotor.

In accordance with the illustrated embodiment of my invention, it is positioned immediately over a continuously moving horizontal conveyor 10 so that it can remove bottles or the like glass articles 11 from the latter one or more at a time at a given point, carry them along a closed vertical path through cleaning and draining positions and then return the articles to their former positions upon the conveyor, which then functions to carry them to a filling and capping machine, or other desired destination.

The rinser, in its preferred embodiment, comprises a main frame 12 mounted in part upon a vertical supporting post 13 at one side of the conveyor 10, and in part upon rails 10ª alongside the conveyor, said frame including a lower horizontal platform 14 supporting a motor M for operating the unit in a manner which will be apparent presently. An upper platform 15 of the frame 12 rests upon vertical legs 15ª and supports a gear box 16 which receives its power from the motor M through a pair of pulleys 17 and a belt 18 which is trained over said pulleys.

This upper platform 15 also supports a pair of coaxial bearings 19 for a horizontal shaft 20, such bearings and shaft being positioned directly above the conveyor 10 and with one end of said shaft (Fig. 3) projecting beyond the adjacent bearing and supporting a rotatable bottle carrier 21 or rotor which functions to move bottles or the like containers from the conveyor, carry them to and away from a cleansing fluid injecting station and a plurality of draining stations and thence back to the conveyor 10.

The rotatable carrier comprises a hub 22 preferably in the form of a horizontal cylinder having one end closed by means of a transverse wall 23 which is formed with a collar 24. A pin 25 secures this collar, and therefore the hub 22, to the shaft so that the two elements may rotate together as a unit. This hub forming cylinder has its other end open to permit placement therein of the cleansing fluid delivery and drainage means, as will be described in detail hereinafter.

Although the bottle carrier may be constructed to incorporate an annular series of single pockets or chambers, I have, for the purpose of the present application, shown pairs or pockets or chambers arranged side by side. Obviously the number can be increased if such is deemed desirable. Each of these pockets or chambers 26 opens at one end radially outward through an imaginary line defining the circumference or periphery of the carrier and additionally is open at two opposed sides so that as each pocket is positioned momentarily with its outer end in proximity to and facing the conveyor 10, bottles or such articles in upright position may be moved by said conveyor 10 into and/or out of such pocket. These pockets are formed by an annular series of circumferentially spaced generally triangular shape dividers 27 or partition members, each of which may well consist of a sheet of metal bent into isosceles triangular form with one side positioned at the periphery of the carrier and with a neck portion adjacent the hub comprising a pair of parallel radial extensions 29 which are spaced apart circumferentially of the hub 22 and separately connected to radial spacer blocks 30 by means of removable pins 31. These spacer blocks 30 may be set into circumferentially spaced recesses 32 which are formed in the exterior surface of the hub 22 at uniformly spaced points. Intermediate each pair of these recesses 32 is a radial opening extending through the hub and snugly fitted in each such opening is a collar 33, one end of which projects a short distance into the hub, the axis of said collar coinciding with that of a radial opening 34 formed axially of a cushion member 35. This cushion member 35 is positioned at the inner end of the corresponding pocket 26 and is provided with a frusto-conical surface 36 which is coaxial with the collar 33 and intended for engagement with the end of the neck or mouth of the bottle 11, or such article, during travel of the latter with the carrier 21 from a point slightly in advance of the cleansing fluid injection station to a point at which the bottle axis again is approximately horizontal. This cushion member 35, being formed of rubber or some similar material, functions as a shock absorber and because of the generally frusto-conical form of this surface it can accommodate bottles and jars having neck or mouth portions of various dimensions and cross-sectional shapes. It also aids in providing a conduit which opens at its outer end only into the container neck. Thus the rinsing medium is applied only to the interior of the container and none reaches the space between the pocket and container.

Both sides of the rotary bottle carrier 21 are closed by cover plates 37, with the exception of that area immediately over the conveyor. At this point (Fig. 4) both cover plates are cut away to provide a pair of opposed vertically elongated openings 28 with which the pockets 26 are brought into register one at a time by intermittent rotation of the carrier 21. These cover plates 37 are secured together in the vicinity of their peripheral portions by means of transverse connector rods 38 which also support a divider plate 39 serving to separate the two annular series of pockets. These cover plates may be supported by means of base flanges 40 (Fig. 1) which are bolted or otherwise secured to extensions (not shown) on the lower horizontal platform 14 and to the rail 10ᵃ at one side of the conveyor 10. Additionally, one of the cover plates (Fig. 2) may also be secured to an angle bar extension 41, which projects forwardly from the upper platform 15. An arcuate cover 37ᵃ is mounted between the upper portions of the side cover plates 37 to enclose the periphery of the bottle carrier 21 in the zones of cleaning fluid injection and draining. Supporting rods 37ᵇ are positioned to insure retention of the bottles or such containers in the pockets 26 while the latter are in such positions that gravity tends to move the containers radially outward.

The means for injecting the cleaning medium into the bottles or jars and thereafter draining such medium (if it be in liquid form) from the containers and disposing of same may well comprise the following structure. A trough-like catch-pan 42 (Figs. 3 and 5) is mounted within the lower half of the cylindrical hub 22 and is suitably secured to an angle iron support 42ᵃ by bolts 42ᵇ, said support in turn being attached to the adjacent cover plate 37 by arms or extensions 43. A drain pipe 44 is connected to the catch-pan. Immediately above this catch-pan is a pair of injector nozzles 45 which are mounted upon a rigid holder 46, the latter being removably and adjustable attached to the aforementioned angle iron support 42ᵃ by means of a bracket 47. Bolts 47ᵃ secure the bracket to the angle iron support, and a bolt 48 and flange 48ᵃ interconnect said bracket and the nozzle holder 46. The two nozzles 45 are mounted in such a fixed position that their longitudinal axes incline upwardly and are aligned with the axes of the pockets and containers as each pocket and a container therein are brought to a standstill with their axes inclined upwardly, for the first time, at an angle of approximately 45°, as illustrated in Fig. 5. These nozzles 45 are connected by means of a pipe 49 and flow control valve 50 to a supply pipe 51. This valve 50 is cam operated being opened and closed in synchronism with operation of the rotor or bottle carrier 21, as will be apparent presently.

Intermittent movement of the bottle carrier 21 is obtained by mechanism including a pawl and ratchet unit 52 (Figs. 2 and 4) which is mounted upon the bottle carrier supporting shaft 20, such unit including a ratchet 53 and a pawl 54, the latter being carried by a lever 55 or arm which is fulcrumed for oscillation about the axis of the shaft 20 a distance equal to the spacing between the teeth of the ratchet 53. This lever 55 is connected by means of an adjustable link 56 to a cam disc 57, the latter being mounted for rotation about the axis of a stub shaft 58 which projects from one side of the gear box 16. This cam disc 57 has its periphery so shaped that during approximately one-half of each revolution it operates through a roller carrying lever 59 to open the aforementioned valve 50. This occurs during the time the pawl 54 is moving from the full line position to the dotted line position shown in Fig. 4. Rotation of the cam disc 57 for the purpose of imparting reciprocatory motion to the connector rod 56 is obtained by a structure substantially as shown in Fig. 1-A. This includes a driven disc 60 which is secured by means of a hub 61 and pin 62 to the shaft 58 and a flat ring, or collar 63, which encircles the hub 61. Spring means comprising an annular series of screws or bolts 64 and coil springs 65 carried by the screws exert a pressure tending to hold the cam disc 57 and said collar 63 in firm contact with the opposite faces of the driven disc 60. Consequently, except when unusual opposition is encountered, rotation of this driven disc 60 imparts corresponding motion to the cam disc 57 so that it will function both to open the flow control valve 50 for the cleaning fluid and actuate the pawl and ratchet mechanism which imparts step-by-step movement to the bottle carrier 21. It is important that upon completion of each indexing operation the cleansing fluid nozzles 45 and the axes of a pair of pockets 26 be in alignment. To effect such alignment and neutralize the angular momentum of the rotor 21, I have provided braking means comprising a brake drum 66 secured to and for rotation with the rotor supporting shaft 20 and a fixed brake shoe 67 which frictionally engages the drum at all times. Thus, immediately upon termination of each operation of the pawl and ratchet unit, the brake promptly stops forward motion of the rotor.

The bottle conveyor 10 moves continuously, in consequence of which means must be provided to momentarily interrupt the advancing movement of the containers themselves at intervals, to permit transfer of the latter to the pockets of the bottle carrier 21. Accordingly, I secure to an extension 68 of the lever 55 a substantially inverted T-shape stop 69 which is capable of oscillation with said lever to and away from a container engaging position immediately over the conveyor 10. This stop (Figs. 1, 2 and 4) comprises a radial arm 70 which is angularly adjustably connected to said extension 68 and of such length that its outer end is in proximity to the periphery of the rotor 21. At this outer end is a pair of oppositely directed fingers each being curved about a center which may be, but is not necessarily, coaxial with the shaft 20. One finger 71 is relatively long, while the other finger 72 is comparatively short. The long finger 71 and the outer end of the arm 70, when the latter extends vertically downward, cooperate to interrupt travel of the containers straight through the pockets with the conveyor 10. These elements are positioned as just described, only when an initially empty pocket 26 or pair of pockets are stationary immediately above the conveyor, by reason of which positioning bottles 11 entering the pockets will be held by the stop until advancing movement or indexing of the rotor 21 removes the bottles from the conveyor and one step toward the cleaning fluid nozzles 45. With such movement of the rotor and therewith the stop, the next succeeding pair of pockets are brought to a position over the conveyor. Immediately, the conveyor 10 removes the rinsed bottles from the pockets. The timing of the various operations is such that immediately following removal of the rinsed bottles from the pockets, the stop 69 returns to its position over the conveyor and prevents passage of any unrinsed bottles through the pockets. At other times the triangular partitions 27 of the rotor function as a stop to momentarily hold back the line of bottles.

Briefly reviewed, the operation of this apparatus is substantially as follows. The main conveyor 10 moves continuously and brings bottles or the like containers in succession to the rinser unit, the rotor or bottle carrier portion of which moves intermittently in a vertical plane at right angles to the direction of travel of the conveyor 10. This intermittent motion or indexing of the rotor brings the open-sided pockets 26 successively into register with opposed inlet and discharged openings in the cover plates 37 so that bottles may be moved into the pockets by means of said conveyor 10. These bottles which have just entered the pocket are held against passage entirely through the latter by means of the stop 69, the long finger 71 of which spans the discharge opening of the rotor housing until the rotor has been indexed sufficiently to completely remove the bottles from contact with the conveyor 10. This rotor, as a result of the step-by-step movement, ultimately positions the bottles as shown in Fig. 5 so that a liquid or other form of cleansing agent may be directed under pressure into the bottles or other containers. Gravity serves to position the neck end of the bottles in snug contact with the cushion members 35 and substantially axially align the bottle neck opening with the nozzles 45. During travel of the containers to and beyond the next two steps, the cleaning liquid drains from the bottles into the catch-pan 42 and from this pan flows through a drain pipe 44. Such cleansing fluid as may perhaps collect on the interior surface of the hub cylinder will be prevented from entering any of the pockets 26 by reason of the radial inward projection of the collars 33 which are fitted in the openings leading to said pockets.

As is apparent, the cam disc 57 rotates continuously thereby oscillating the pawl carrying lever 55 so that it periodically indexes the rotor or bottle carrier the desired distance. This cam disc (Fig. 4) also actuates the valve lever 59 (Figs. 2 and 4) at regular time intervals so that while the pawl carrying lever 55 is moving in a counterclockwise direction preparatory to effecting a further indexing of the rotor, the cleansing liquid will be discharged from the nozzles 45 into the containers. Immediately upon initiating clockwise indexing movement to the rotor, said cam disc will have assumed such a position that the valve lever 59 no longer holds the valve 50 open. Owing to the constant frictional engagement of the brake shoe 67 with the brake drum 66, the rotary bottle carrier comes to a standstill immediately upon cessation of positive indexing by means of said pawl and ratchet unit.

Modifications may be resorted to within the spirit and scope of the appended claims.

I claim:

1. In apparatus of the character described, a rotatable hollow cylindrical hub mounted with its axis disposed horizontally, an annular series of bottle receiving pockets extending radially outward from the periphery of said hub, each pocket being open at its outer end and at opposite sides whereby bottles may enter and leave the pockets along a path substantially parallel to the axis to the hub, vertical plates closing the opposite sides of the pockets except at that point at which the pockets open directly downward, each pocket having a bottle neck centering cushion at the hub end, each cushion having an axial opening providing communication between the interior of the hub and a pocket, an upwardly inclined cleaning fluid nozzle within the hub, means for effecting intermittent rotation of the hub and pockets to bring the latter successively into register with the nozzle, automatic means for effecting flow of the cleaning fluid through the nozzle each time a pocket is brought into register with the nozzle, and an upwardly opening catch-pan mounted in the lower portion of the hub and of sufficient width to receive cleaning fluid draining from all of the pockets when positioned with their axes above a horizontal center line through the hub.

2. In apparatus of the character described, a rotatable hollow cylindrical hub mounted with its axis disposed horizontally, an annular series of bottle receiving pockets extending radially outward from the periphery of said hub, each pocket being open at its outer end and at opposite sides whereby bottles may enter and leave the pockets along a path substantially parallel to the axis to the hub, vertical plates closing the opposite sides of the pockets except at that point at which the pockets open directly downward, each pocket having a bottle neck centering cushion at the hub end, each cushion having an axial opening providing communication between the interior of the hub and a pocket, an upwardly inclined cleaning fluid nozzle within the hub, means for effecting intermittent rotation of the hub and pockets to bring the latter successively into register with the nozzle, automatic means for effecting flow of the cleaning fluid through the nozzle each time a pocket is brought into register with the nozzle, and sleeves mounted in the axial openings and projecting a short distance into the hub whereby to prevent entry of any cleaning fluid accumulated in the lower portion of the hub, into the lowermost pocket.

3. In combination, a horizontal conveyor for bringing open top bottles or the like articles in upright position to and removing them from a rinsing station, rinsing apparatus at said station comprising a rotary drum-shaped bottle carrier mounted above and between the ends of the conveyor with its axis disposed horizontally and extending parallel to the length of the conveyor, said carrier including an annular series of bottle accommodating pockets each of which opens radially outward and through both sides of the bottle carrier, a housing for the bottle carrier including a cover plate for each side of said carrier, said cover plates having a pair of opposed horizontally aligned openings directly over the horizontal conveyor to permit movement of bottles into and out of the pockets as the latter are brought into register with said openings, means including pawl and ratchet mechanism for indexing the rotary bottle carrier to thereby move bottles away from the conveyor to rinsing and drainage stations and thence back to the conveyor, a cleaning fluid injection nozzle positioned to direct a stream of cleaning fluid radially outward into the bottles at the cleaning station, means operating in synchronism with indexing of the rotary carrier for controlling the flow of the cleaning fluid to the nozzle, a stop device operable in response to actuation of the pawl and ratchet mechanism for holding bottles in the pockets during the period of removal of the bottles laterally from the conveyor by the rotary bottle carrier.

4. The combination defined in claim 3 in which said stop comprises a radial arm mounted for oscillation about the axis of said hub and arcuate fingers at the outer end of the arm.

References Cited in the file of this patent

UNITED STATES PATENTS

| | | |
|---|---|---|
| 807,367 | Eick | Dec. 12, 1905 |
| 841,299 | Young | Jan. 15, 1907 |
| 1,655,941 | Dawson | Jan. 10, 1928 |
| 1,827,553 | Algeo | Oct. 13, 1931 |
| 1,906,548 | Davis | May 2, 1933 |
| 1,975,760 | Arbenz | Oct. 9, 1934 |
| 2,675,011 | Maddaford | Apr. 13, 1954 |